United States Patent
Liu et al.

(10) Patent No.: US 11,044,778 B2
(45) Date of Patent: Jun. 22, 2021

(54) USER EQUIPMENT, BASE STATION, AND RELATED METHOD

(71) Applicants: SHARP KABUSHIKI KAISHA, Sakai (JP); FG Innovation Company Limited, Tuen Mun (HK)

(72) Inventors: Renmao Liu, Shanghai (CN); Fangying Xiao, Shanghai (CN); Ningjuan Chang, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/495,710

(22) PCT Filed: Mar. 20, 2018

(86) PCT No.: PCT/CN2018/079595
§ 371 (c)(1),
(2) Date: Sep. 19, 2019

(87) PCT Pub. No.: WO2018/171581
PCT Pub. Date: Sep. 27, 2018

(65) Prior Publication Data
US 2020/0100316 A1 Mar. 26, 2020

(30) Foreign Application Priority Data
Mar. 23, 2017 (CN) .......................... 201710180639.6

(51) Int. Cl.
*H04W 76/27* (2018.01)
*H04W 4/70* (2018.01)
(Continued)

(52) U.S. Cl.
CPC ............. *H04W 76/27* (2018.02); *H04W 4/70* (2018.02); *H04W 72/042* (2013.01);
(Continued)

(58) Field of Classification Search
CPC ..... H04W 76/27; H04W 4/70; H04W 72/042; H04W 72/0453; H04W 74/0833; H04W 80/02
See application file for complete search history.

(56) References Cited

U.S. PATENT DOCUMENTS 9,544,891 B2 * 1/2017 Kim .................... H04W 72/042
2013/0114533 A1 5/2013 Ji et al.
(Continued)

FOREIGN PATENT DOCUMENTS

WO 2016099057 A1 6/2016

OTHER PUBLICATIONS

Ericsson, Qualcomm: "New WID on Even further enhanced MTC for LTE"; Approval; 10.1.1; RP-170732(revision of RP-170465); 3GPP TSG RAN Meeting #75 Dubrovnik, Croatia, Mar. 6-9, 2017.

*Primary Examiner* — Ajay Cattungal
(74) *Attorney, Agent, or Firm* — ScienBiziP, P.C.

(57) ABSTRACT

The present disclosure provides a method used in user equipment, comprising: receiving an indication for enabling a sub-physical resource block enhancement mode from a base station through a media access control (MAC) random access response (RAR) or radio resource control signaling, wherein one or more bits in the MAC RAR indicate that the sub-physical resource block enhancement mode is to be applied to transmission of a random access message 3 "Msg3" and subsequent PUSCHs; enabling the sub-physical resource block enhancement mode in response to the indication, and receiving downlink control information (DCI) from the base station, the DCI comprising a subcarrier indication field indicating the number of subcarriers used for a physical uplink shared channel (PUSCH) and locations of the subcarriers; and transmitting the PUSCH according to the subcarrier indication field.

4 Claims, 5 Drawing Sheets

(51) Int. Cl.
*H04W 72/04* (2009.01)
*H04W 74/08* (2009.01)
*H04W 80/02* (2009.01)

(52) U.S. Cl.
CPC ... *H04W 72/0453* (2013.01); *H04W 74/0833* (2013.01); *H04W 80/02* (2013.01)

(56) References Cited

U.S. PATENT DOCUMENTS

| | | |
|---|---|---|
| 2016/0088594 A1 | 3/2016 | Xiong et al. |
| 2017/0134129 A1* | 5/2017 | You .................... H04L 25/0226 |
| 2017/0311326 A1* | 10/2017 | Wong ................ H04W 72/0453 |
| 2018/0367278 A1* | 12/2018 | Chatterjee ............ H04L 1/1858 |

* cited by examiner

USER EQUIPMENT, BASE STATION, AND RELATED METHOD

TECHNICAL FIELD

The present disclosure relates to the field of wireless communications technologies. More specifically, the present disclosure relates to user equipment, a base station, and related methods.

BACKGROUND

A new work item on even further enhancement of machine type communication (MTC) (see non-patent literature: RP-170732: New WID on Even further enhanced MTC for LTE) was approved at the 3rd Generation Partnership Project (3GPP) RAN #75 plenary meeting held in March 2017. One of the goals of the research project is to support resource allocation based on sub-physical resource blocks (sub-PRBs) (namely, support resource allocation based on less than one PRB) so as to improve the spectral efficiency of an MTC physical uplink shared channel.

The problem that needs to be solved is how to support sub-PRB resource allocation.

SUMMARY

According to a first aspect of the present disclosure, a method used in user equipment is provided, comprising: receiving an indication for enabling a sub-physical resource block enhancement mode from a base station through a media access control (MAC) random access response (RAR) or radio resource control signaling, wherein one or more bits in the MAC RAR indicate that the sub-physical resource block enhancement mode is to be applied to transmission of a random access message 3 "Msg3" and subsequent physical uplink shared channels (PUSCHs); enabling the sub-physical resource block enhancement mode in response to the indication, and receiving downlink control information (DCI) from the base station, the DCI comprising a subcarrier indication field indicating the number of subcarriers used for a PUSCH and locations of the subcarriers; and transmitting the PUSCH according to the subcarrier indication field.

In an embodiment, the PUSCH is transmitted in a subframe $n+k_i$, where $i=0, 1, \ldots, N*(12/Nsc)-1$, wherein a subframe n is a last subframe of a machine type communication physical downlink control channel (MPDCCH) for scheduling the PUSCH, $N_c\{n1, n2, \ldots, n_{max}\}$, which is determined by a repetition number field indicated in the DCI, $\{n1, n2, \ldots, n_{max}\}$ is a predefined group of values, Nsc is the number of subcarriers indicated in the subcarrier indication field, a subframe $n+k_0$ is a first subframe available for transmitting the PUSCH subsequent to a subframe $n+x$, $k_0<k_1<k_2<\ldots<k_{N-1}$ are values related to N subframes available for transmitting the PUSCH, and x is a constant.

In an embodiment, a same scrambling sequence and/or a same redundancy version is applied to PUSCHs on Nacc* (12/Nsc) consecutive absolute subframes.

In an embodiment, a transport block size of the PUSCH is determined at least based on $N_{PRB}$ determined by the number of subcarriers allocated for the PUSCH, wherein $N_{PRB}$ is 3 when the number of subcarriers allocated for the PUSCH is 3, or $N_{PRB}$ is 6 when the number of subcarriers allocated for the PUSCH is 6.

According to a second aspect of the present disclosure, user equipment is provided, comprising a transceiver, a processor, and a memory, the processor storing instructions executable by the processor so that the user equipment performs the method according to the aforementioned first aspect.

According to a third aspect of the present disclosure, a method used in a base station is provided, comprising: transmitting an indication for enabling a sub-physical resource block enhancement mode to user equipment through a media access control (MAC) random access response (RAR) or radio resource control signaling, wherein one or more bits in the MAC RAR indicate that the sub-physical resource block enhancement mode is to be applied to transmission of a random access message 3 "Msg3" and subsequent physical uplink shared channels (PUSCHs); transmitting downlink control information (DCI) to the user equipment, the DCI comprising a subcarrier indication field indicating the number of subcarriers used for a PUSCH and locations of the subcarriers; and receiving the PUSCH from the user equipment.

In an embodiment, the PUSCH is received in a subframe $n+k_i$, where $i=0, 1, \ldots, N*(12/Nsc)-1$, wherein a subframe n is a last subframe of a machine type communication physical downlink control channel (MPDCCH) for scheduling the PUSCH, $N_c\{n1, n2, \ldots, n_{max}\}$, which is determined by a repetition number field indicated in the DCI, $\{n1, n2, \ldots, n_{max}\}$ is a predefined group of values, Nsc is the number of subcarriers indicated in the subcarrier number indication field, a subframe $n+k_0$ is a first subframe available for transmitting the PUSCH subsequent to a subframe $n+x$, $k_0<k_1<k_2<\ldots<k_{N-1}$ are values related to N subframes available for transmitting the PUSCH, and x is a constant.

In an embodiment, a same scrambling sequence and/or a same redundancy version is applied to PUSCHs on Nacc* (12/Nsc) consecutive absolute subframes.

In an embodiment, a transport block size of the PUSCH is determined at least based on $N_{PRB}$ determined by the number of subcarriers allocated for the PUSCH, wherein $N_{PRB}$ is 3 when the number of subcarriers allocated for the PUSCH is 3, or $N_{PRB}$ is 6 when the number of subcarriers allocated for the PUSCH is 6.

According to a fourth aspect of the present disclosure, a base station is provided, comprising a transceiver, a processor, and a memory, the processor storing instructions executable by the processor so that the base station performs the method according to the aforementioned third aspect.

BRIEF DESCRIPTION OF THE DRAWINGS

The above and other features of the present disclosure will become more apparent with the following detailed description in conjunction with the accompanying drawings.

DETAILED DESCRIPTION OF EMBODIMENTS

The following describes the present application in detail with reference to the accompanying drawings and specific embodiments. It should be noted that the present application should not be limited to the specific embodiments described below. In addition, for simplicity, detailed description of the known art not directly related to the present application is omitted to prevent confusion in understanding the present application.

Figure 1:
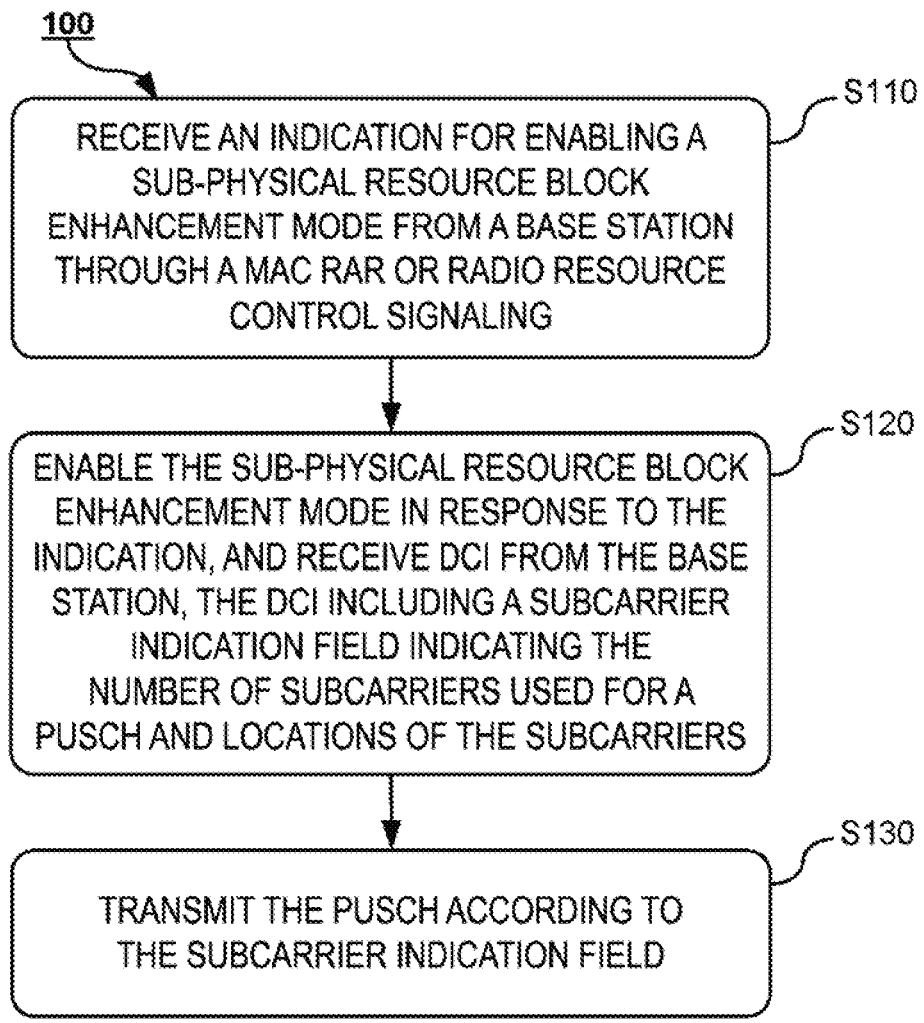
FIG. 1 is a flowchart of a method used in user equipment according to an embodiment of the present disclosure.

FIG. 1 is a flowchart of a method 100 used in user equipment (UE) according to an embodiment of the present disclosure. As shown in the figure, the method 100 includes the following steps:

Step S110: receive an indication for enabling a sub-physical resource block enhancement mode from a base station through a media access control (MAC) random access response (RAR) or radio resource control signaling. For example, one or more bits in the MAC RAR indicate that the sub-physical resource block enhancement mode is to be applied to transmission of a random access message 3 "Msg3" and subsequent physical uplink shared channels (PUSCHs).

Step S120: enable the sub-physical resource block enhancement mode in response to the indication, and receive downlink control information (DCI) from the base station, the DCI including a subcarrier indication field indicating the number of subcarriers used for a PUSCH and locations of the subcarriers.

Step S130: transmit the PUSCH according to the subcarrier indication field.

In an embodiment, in step S130, the PUSCH is transmitted in a subframe $n+k_i$, where $i=0, 1, \ldots, N*Q-1$, wherein a subframe n is a last subframe of a machine type communication physical downlink control channel (MPDCCH) for scheduling the PUSCH, $N_c\{n1, n2, \ldots, n_{max}\}$, which is determined by a repetition number field indicated in the DCI, and $\{n1, n2, \ldots, n_{max}\}$ is a predefined group of values. Q may be a fixed value or a variable. For example, $Q=12/Nsc$, where Nsc is the number of subcarriers indicated in the subcarrier indication field. A subframe $n+k_0$ is a first subframe available for transmitting the PUSCH subsequent to a subframe $n+x$, where $k_0<k_1<k_2<\ldots<k_{N-1}$ are values related to N subframes available for transmitting the PUSCH, and x is a constant.

Here, Nsc is 12 when the UE operates in a coverage enhancement mode A or a coverage enhancement mode B.

$\{n1, n2, \ldots, n_{max}\}$ is determined by $n_{max}$ configured through RRC signaling. For example, 3GPP TS 36.331 defines a group of $n_{max}$s. For example, for the coverage enhancement mode B:

pusch-maxNumRepetitionCEmodeB-r13 ENUMERATED {r192, r256, r384, r512, r768, r1024, r1536, r2048} OPTIONAL,—Need OR.

The value of $n_{max}$ is configured for the UE from the aforementioned set using radio resource control (RRC) signaling.

TS 36.213 defines a set of eight values for each $n_{max}$ above:

192 {4, 8, 16, 32, 64, 128, 256, 512}
256 {4, 8, 16, 32, 64, 128, 192, 256}
384 {4, 16, 32, 64, 128, 192, 256, 384}
. . .
2048 {4, 16, 64, 128, 256, 512, 1024, 2048}

The base station (also referred to as an eNB) selects a value for the PUSCH from the aforementioned set corresponding to $n_{max}$ according to $n_{max}$ configured through the RRC signaling, and indicates the value to the UE through the DCI, where the value is N (the repeated transmission number of the PUSCH).

For example, for a frequency division duplex (FDD) system, x=4.

In an embodiment, a same scrambling sequence and/or a same redundancy version is applied to PUSCHs on Nacc*Q consecutive absolute subframes. Q may be a fixed value or a variable. For example, Q=12/Nsc, where Nsc is the number of subcarriers indicated in the subcarrier indication field.

In an embodiment, a transport block size of the PUSCH is determined at least based on $N_{PRB}$ determined by the number of subcarriers allocated for the PUSCH, where $N_{PRB}$ is 3 when the number of subcarriers allocated for the PUSCH is 3, or $N_{PRB}$ is 6 when the number of subcarriers allocated for the PUSCH is 6.

Figure 2:
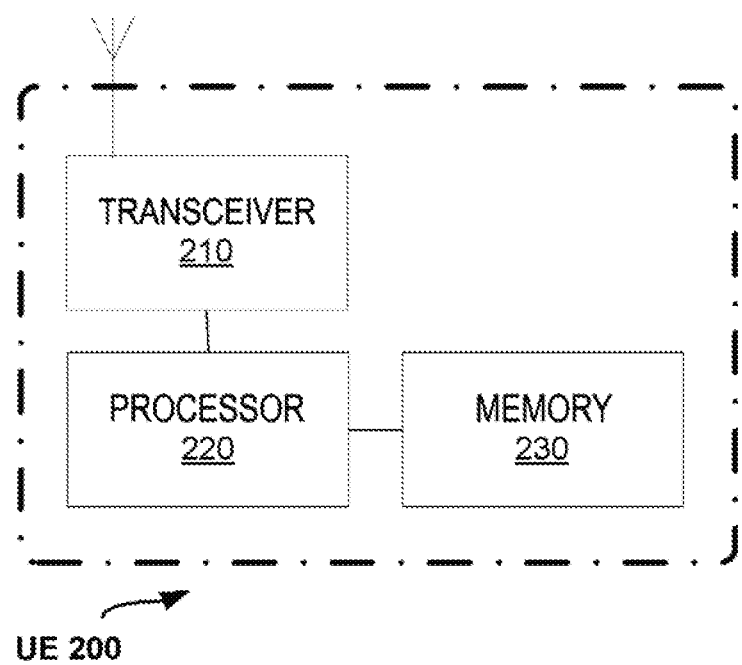
FIG. 2 is a block diagram of user equipment according to an embodiment of the present disclosure.

In accordance with the method 100 described above, the present disclosure provides user equipment (UE). FIG. 2 is a block diagram of UE 200 according to an embodiment of the present disclosure. As shown in the figure, the UE 200 includes a transceiver 210, a processor 220, and a memory 230, the processor 230 storing instructions executable by the processor 220 so that the user equipment 200 performs the method 100 described above with reference to FIG. 1.

Specifically, the UE 200 receives an indication for enabling a sub-physical resource block enhancement mode from a base station through a media access control (MAC) random access response (RAR) or radio resource control signaling. For example, one or more bits in the MAC RAR indicate that the sub-physical resource block enhancement mode is to be applied to transmission of a random access message 3 "Msg3" and subsequent physical uplink shared channels (PUSCHs).

Further, the UE 200 enables the sub-physical resource block enhancement mode in response to the indication, and receives downlink control information (DCI) from the base station, the DCI including a subcarrier indication field indicating the number of subcarriers used for a PUSCH and locations of the subcarriers.

Further, the UE 200 transmits the PUSCH according to the subcarrier indication field.

Figure 3:
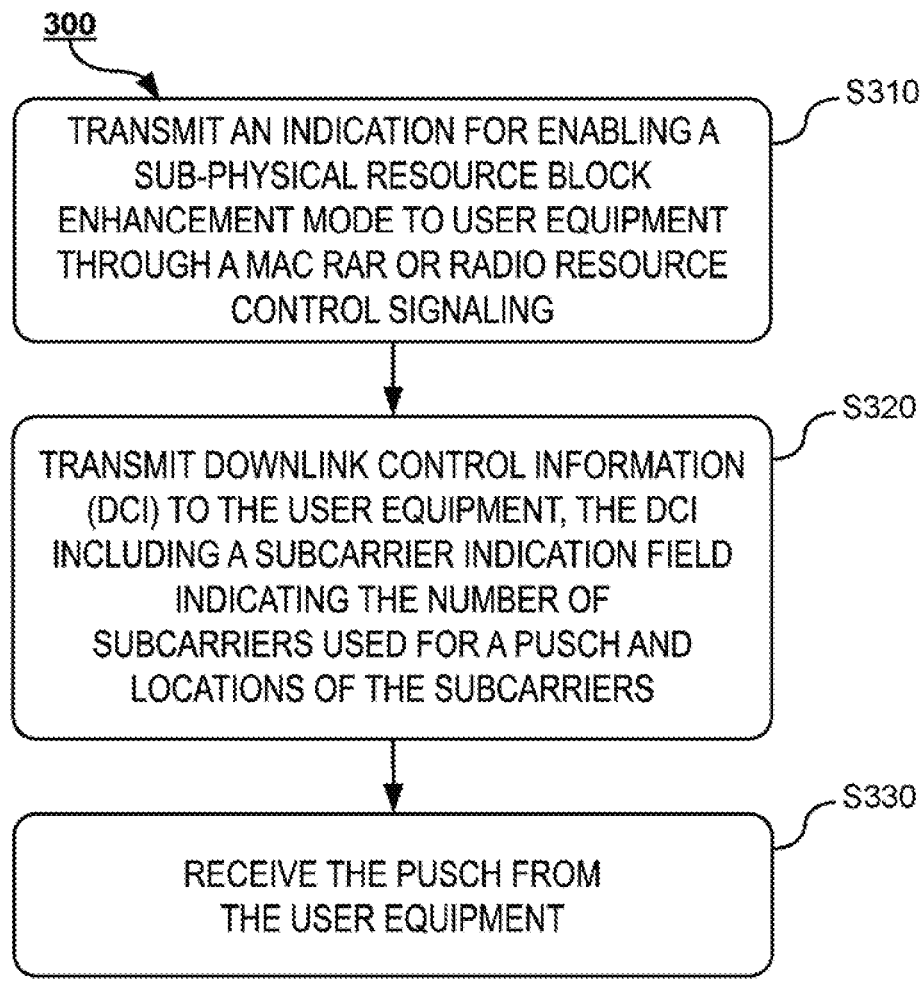
FIG. 3 is a flowchart of a method used in a base station according to an embodiment of the present disclosure.

In accordance with the method 100 described above, the present disclosure further provides a method used in a base station. FIG. 3 is a flowchart of a method 300 used in a base station according to an embodiment of the present disclosure. As shown in the figure, the method 300 includes the following steps.

Step S310: transmit an indication for enabling a sub-physical resource block enhancement mode to user equipment through a media access control (MAC) random access response (RAR) or radio resource control signaling. For example, one or more bits in the MAC RAR indicate that the sub-physical resource block enhancement mode is to be applied to transmission of a random access message 3 "Msg3" and subsequent physical uplink shared channels (PUSCHs).

Step S320: transmit downlink control information (DCI) to the user equipment, the DCI including a subcarrier indication field indicating the number of subcarriers used for a PUSCH and locations of the subcarriers.

Step S330: receive the PUSCH from the user equipment.

In an embodiment, in step S330, the PUSCH is received in a subframe $n+k_i$, where $i=0, 1, \ldots, N*Q-1$, wherein a subframe n is a last subframe of a machine type communication physical downlink control channel (MPDCCH) for scheduling the PUSCH, $N_c\{n1, n2, \ldots, n_{max}\}$, which is determined by a repetition number field indicated in the DCI, and $\{n1, n2, \ldots, n_{max}\}$ is a predefined group of values. Q may be a fixed value or a variable. For example, $Q=12/Nsc$, where Nsc is the number of subcarriers indicated in the subcarrier number indication field. A subframe $n+k_0$ is a first subframe available for transmitting the PUSCH subsequent to a subframe n+x, $k_0<k_1<k_2<\ldots<k_{N-1}$ are values related to N subframes available for transmitting the PUSCH, and x is a constant.

In an embodiment, a same scrambling sequence and/or a same redundancy version is applied to PUSCHs on Nacc*Q consecutive absolute subframes. Q may be a fixed value or a variable. For example, Q=12/Nsc, where Nsc is the number of subcarriers indicated in the subcarrier indication field.

In an embodiment, a transport block size of the PUSCH is determined at least based on $N_{PRB}$ determined by the number of subcarriers allocated for the PUSCH, where $N_{PRB}$ is 3 when the number of subcarriers allocated for the PUSCH is 3, or $N_{PRB}$ is 6 when the number of subcarriers allocated for the PUSCH is 6.

Figure 4:
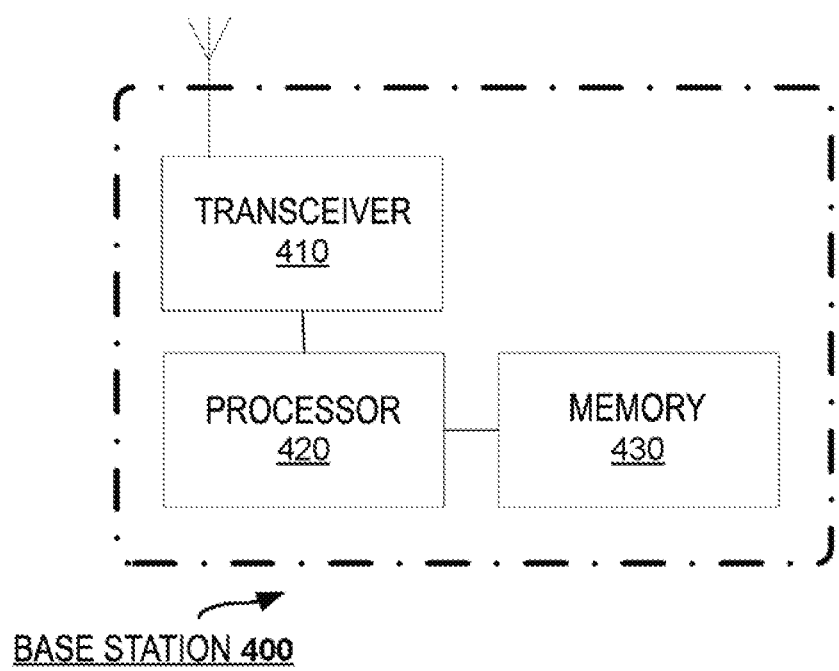
FIG. 4 is a block diagram of a base station according to an embodiment of the present disclosure.

In accordance with the method 300 described above, the present disclosure provides a base station. FIG. 4 is a block diagram of a base station 400 according to an embodiment of the present disclosure. As shown in the figure, the base station 400 includes a transceiver 410, a processor 420, and a memory 430, the processor 430 storing instructions executable by the processor 420 so that the base station 400 performs the method 300 described above with reference to FIG. 3.

Specifically, the base station 300 transmits an indication for enabling a sub-physical resource block enhancement mode to user equipment through a media access control (MAC) random access response (RAR) or radio resource control signaling. For example, one or more bits in the MAC RAR indicate that the sub-physical resource block enhancement mode is to be applied to transmission of a random access message 3 "Msg3" and subsequent physical uplink shared channels (PUSCHs).

Further, the base station 300 transmits downlink control information (DCI) to the user equipment, the DCI including a subcarrier indication field indicating the number of subcarriers used for a PUSCH and locations of the subcarriers.

Further, the base station 300 receives the PUSCH from the user equipment.

The aspects, features, and examples described above with respect to the method 100 are also applicable to the UE 200, the method 300, and the base station 400.

Some examples are given below to provide a more detailed description of the technical solutions of the method 100, the UE 200, the method 300, and the base station 400 described above.

The following embodiments may be implemented separately.

Determination of Repetition Number, Scrambling Sequence, and Redundancy Version in Sub-PRB Resource Allocation In the existing 3GPP standard specifications related to MTC, the smallest resource allocation unit for a PUSCH is one physical resource block (PRB). MTC UE in an RRC connected state supports two coverage enhancement modes: a coverage enhancement mode A (CE mode A) and a coverage enhancement mode B (CE mode B). The coverage enhancement mode A is used for UE having good channel conditions, not requiring coverage enhancement or requiring small coverage enhancement, and not requiring repeated transmission or requiring quite few repeated transmissions; the coverage enhancement mode B is used for UE having poor channel conditions, requiring large or quite large coverage enhancement, or requiring many or quite many repeated transmissions.

A base station (also referred to as an eNB) expands the coverage of a PUSCH by repeatedly transmitting the PUSCH. The specific implementation is as follows: the eNB configures a maximum value of the repeated transmission number of the PUSCH through RRC signaling, and one repeated PUSCH transmission number set is defined for each configurable maximum value of the repeated transmission number. For UE in the coverage enhancement mode A, one repeated PUSCH transmission number set contains four values, while for UE in the coverage enhancement mode B, one repeated PUSCH transmission number set contains eight values.

The UE obtains the maximum value of the repeated transmission number of the PUSCH through RRC signaling, where a repeated PUSCH transmission number set can be known from the maximum value. The repeated transmission number $N_{rep}^{PUSCH}$ used in this PUSCH transmission can be obtained from DCI.

In an existing MTC system, a parameter Nacc is defined. The Nacc refers to the number of consecutive absolute subframes in the time domain, and PUSCHs transmitted in these subframes use the same scrambling sequence and/or the same redundancy version. The parameter is a fixed value. For an FDD system, Nacc=4; for a TDD system, Nacc=5.

The MTC UE can obtain, through the DCI, the repeated transmission number $N_{rep}^{PUSCH}$ in this PUSCH transmission and an absolute subframe number of a first uplink subframe used for PUSCH transmission. Thus, the total number $N_{abs}^{PUSCH}$ of absolute subframes over which this repeated PUSCH transmission needs to be performed can be known. A same scrambling sequence is applied to a PUSCH on each subframe used for PUSCH transmission in the Nacc consecutive absolute subframes.

The redundancy version is determined in the following manner: the total number $N_{abs}^{PUSCH}$ of absolute subframes over which this repeated PUSCH transmission is performed is divided into multiple groups of Nacc consecutive absolute subframes, and 4 redundancy versions RV0, RV1, RV2, and RV3 of PUSCHs are cyclically applied, in an order of RV0, RV2, RV3, and RV1, to the multiple groups of Nacc consecutive absolute subframes starting from the first group of Nacc consecutive absolute subframes until the last group. A PUSCH on each subframe available for PUSCH transmission in the same group of Nacc consecutive absolute subframes uses the same redundancy version.

The smallest resource allocation unit for the existing MTC UE is one PRB, namely, occupying a bandwidth of 12 subcarriers in the frequency domain; the subcarrier spacing in the existing LTE is 15 kHz; and the physical bandwidth of one PRB is 180 kHz. When the UE has poor channel conditions, to achieve the desired reception quality for a PUSCH, available methods include increasing the transmit power of the UE or increasing the repeated transmission number of the PUSCH. However, the UE has transmission power limits, or has a transmission power maximum. For MTC UE having poor channel conditions or poor coverage, existing LTE systems already use the transmission power maximum. Moreover, the same power is applied to different frequency bandwidths, resulting in different quality for received signal strength or received signal reception. The larger the frequency bandwidth, the lower the reception quality. Furthermore, for the same UE requiring coverage enhancement, transmission of data packets of the same size using a small frequency bandwidth consumes fewer time-frequency resources than transmission of data packets using a large frequency bandwidth.

In existing LTE systems, the minimum allocation bandwidth for a PUSCH of MTC UE is one PRB. In order to achieve better spectral efficiency, a frequency bandwidth of less than one PRB may be used for transmitting UE having poor channel conditions. Namely, the smallest unit for resource allocation of the PUSCH should be less than 12 subcarriers, namely, sub-PRB enhancement must be performed. The sub-PRB enhancement function refers to performing function enhancement on UE in the coverage enhancement mode B and/or coverage enhancement mode A in existing LTE systems, so as to support resource allocation or configuration for a PUSCH and/or PUCCH (physical uplink control channel) of less than one PRB or less than 12 subcarriers. For example, the allocatable subcarrier numbers are 1, 2, 3, 4, 6, 12, and the like, namely, divisible by 12, and allocated multiple subcarriers are consecutive subcarriers in the frequency domain. Optionally, the allocated multiple subcarriers may also be inconsecutive subcarriers in one PRB.

The frequency resources allocated to the PUSCH are less than one PRB, namely, the number of allocated subcarriers is less than 12. However, in existing LTE systems, the smallest allocation unit for a PUSCH of MTC UE is one PRB, namely, 12 subcarriers. The design of the value of the repetition number of the PUSCH is performed by the surrounding minimum allocation resource for one PRB. When the resource allocation unit for the PUSCH is less than one PRB, for transmission of data packets of the same size, in order to achieve the same received signal quality, the repeated transmission number required for the PUSCH should be increased.

In order to reduce standardization work as much as possible, a simple way is to use the repetition number value set for the PUSCH in existing LTE systems and the configuration and indication methods thereof, and when calculating the actual repeated transmission number of the PUSCH, multiply a configured value or indicated value of the repeated PUSCH transmission number by a value Q to obtain the repeated transmission number actually required for the PUSCH; namely, the actual repeated PUSCH transmission number=the configured value or indicated value of the PUSCH repetition number*Q. Q may be a fixed value or a variable. For example, Q=12/the number Nsc of allocated subcarriers. If the number of allocated subcarriers is 3, and the repeated transmission number of this PUSCH indicated by the MPDCCH is 16, Q=12/Nsc=4; in this way, the actual repeated transmission number of this PUSCH is 16*Q=64.

Optionally, a fixed value Q may be set for each allocatable subcarrier number, as shown in Table 1.

TABLE 1

| | Number of subcarriers | | | | | |
| --- | --- | --- | --- | --- | --- | --- |
| | 1 | 2 | 3 | 4 | 6 | 12 |
| Q | 12 | 6 | 4 | 3 | 2 | 1 |

The UE can obtain the value of Q from Table 1 according to the number of subcarriers allocated to the PUSCH. The actual repeated transmission number of the PUSCH can thus be obtained. For example, the number of allocated subcarriers is 3, and the repeated transmission number of this PUSCH indicated by the MPDCCH is 16. As can be seen from Table 1, at this time Q=4. The actual repeated transmission number of this PUSCH is 16*Q=16*4=64.

Optionally, the repetition number value of the PUSCH may be redesigned according to the minimum number of subcarriers supported by sub-PRB resource allocation, and the maximum repetition number value should be a multiple of an existing maximum repetition number value. For example, if the existing maximum value of the allowable repeated transmission number of the PUSCH is 2048, then the redesigned maximum value of the repeated PUSCH transmission number may be 2048*(12/the minimum allocatable subcarrier number). If the minimum number of subcarriers is 3, the allowable maximum value is 8192. However, the size of each PUSCH repetition number set does not change. For example, for UE in the coverage enhancement mode B, one repeated PUSCH transmission number set still contains eight values. In this way, three bits are still used in DCI to indicate the repeated transmission number of the PUSCH.

The same applies to the determination of a scrambling sequence and a redundancy version of a PUSCH. For example, in existing LTE systems, the same scrambling sequence is applied to PUSCHs on subframes available for PUSCH transmission in Nacc consecutive absolute subframes, and the same redundancy version is also applied to PUSCHs on subframes available for PUSCH transmission in Nacc consecutive absolute subframes. Nacc is a fixed value. For FDD, Nacc=4; for TDD, Nacc=5.

For UE with sub-PRB resource allocation, a simple implementation is to multiply Nacc by a value P to obtain Macc consecutive absolute subframes in sub-PRB resource allocation. For sub-PRB resource allocation, the same scrambling sequence and/or the same redundancy version can be applied to PUSCHs on subframes available for PUSCH transmission in Macc consecutive absolute subframes. Macc=Nacc*P, where P may be a fixed value or a variable. For example, P=12/the number Nsc of allocated subcarriers. If the number of allocated subcarriers is 3, then P=12/3=4; in this way, Macc=Nacc*4. Namely, the same scrambling sequence and/or the same redundancy version are applied to PUSCHs on subframes available for PUSCH transmission in Nacc*4 consecutive absolute subframes. The number Nsc of subcarriers is the number of subcarriers allocated to this PUSCH. Other steps or procedures for determining the scrambling sequence and the redundancy version of the PUSCH are similar to those in existing LTE systems and remain unchanged.

Optionally, a fixed value P may be set for each allocatable subcarrier number, as shown in Table 2.

TABLE 2

| | Number of subcarriers | | | | | |
| --- | --- | --- | --- | --- | --- | --- |
| | 1 | 2 | 3 | 4 | 6 | 12 |
| P | 12 | 6 | 4 | 3 | 2 | 1 |

The UE can obtain the value of P from Table 2 according to the number of subcarriers allocated to the PUSCH. Macc consecutive absolute subframes in sub-PRB resource allocation can thus be obtained. For example, the number of allocated subcarriers is 3, and as can be seen from Table 2, at this time P=4. Regarding Macc consecutive absolute subframes in sub-PRB resource allocation, Macc=Nacc*4.

The values P and Q in this embodiment may be the same or different.

Optionally, for sub-PRB resource allocation, the aforementioned determining method for a repeated PUSCH transmission number is used, while the determining method for a scrambling sequence and a redundancy version is not changed; namely, a scrambling sequence and a redundancy version of a PUSCH using sub-PRB resource allocation are determined using the determining method for a scrambling sequence and a redundancy version of a PUSCH of MTC UE in existing LTE systems.

Indication of Subcarriers and Determination of Transport Block Size in Sub-PRB Resource Allocation In the existing 3GPP standard specifications related to MTC, the smallest resource allocation unit for a PUSCH is one physical resource block (PRB). MTC UE in an RRC connected state supports two coverage enhancement modes: a coverage enhancement mode A (CE mode A) and a coverage enhancement mode B (CE mode B). The coverage enhancement mode A is used for UE having good channel conditions, not requiring coverage enhancement or requiring small coverage enhancement, and not requiring repeated transmission or requiring quite few repeated transmissions; the coverage enhancement mode B is used for UE having poor channel conditions, requiring large or quite large coverage enhancement or requiring many or quite many repeated transmissions.

The smallest resource allocation unit for the existing MTC UE is one PRB, namely, occupying a bandwidth of 12 subcarriers in the frequency domain, the subcarrier spacing in the existing LTE is 15 kHz, and the physical bandwidth of one PRB is 180 kHz. When the UE has poor channel conditions, to achieve the desired reception quality for a PUSCH, available methods include increasing the transmit power of the UE or increasing the repeated transmission number of the PUSCH. However, the UE has a transmit power limit, or has a transmit power maximum. For MTC UE having poor channel conditions or poor coverage, existing LTE systems already use the maximum power for transmission. On the other hand, the same power is applied to different frequency bandwidths, resulting in different received signal strength or signal reception quality. The larger the frequency bandwidth, the lower the reception quality. Furthermore, for the same UE requiring large coverage enhancement, transmission of data packets of the same size using a small frequency bandwidth consumes fewer time-frequency resources than transmission using a large frequency bandwidth.

In existing LTE systems, the minimum allocation bandwidth for a PUSCH of MTC UE is one PRB. In order to achieve better spectral efficiency, a frequency bandwidth of less than one PRB needs be used for transmitting UE having poor channel conditions. Namely, the smallest unit for resource allocation of the PUSCH should be less than 12 subcarriers, namely, sub-PRB enhancement must be performed. The sub-PRB enhancement function refers to performing function enhancement on UE in the coverage enhancement mode B and/or coverage enhancement mode A in existing LTE systems so as to support resource allocation or configuration for a PUSCH and/or PUCCH (physical uplink control channel) based on less than one PRB or less than 12 subcarriers. For example, the allocatable subcarrier numbers are 1, 2, 3, 4, 6, 12, and the like, namely, divisible by 12, and allocated multiple subcarriers are consecutive subcarriers in the frequency domain. Optionally, the allocated multiple subcarriers may also be inconsecutive subcarriers in one PRB.

Sub-PRB resource allocation is mainly applied to the coverage enhancement mode B. Thus, this embodiment uses the coverage enhancement mode B as an example for discussion. The same applies to the coverage enhancement mode A or other application scenarios.

In existing LTE systems, the DCI format used for scheduling a PUSCH of UE in the coverage enhancement mode B is DCI format 6-0B; reference can be made to non-patent literature: 3GPP TS 36.212 V14.0.0 (2016 September). The maximum operation bandwidth of existing MTC UE is 1.4 MHz or 6 PRBs. In 3GPP Rel-13, the system bandwidth is divided into multiple narrowbands, each narrowband having a frequency width with six consecutive PRBs. For example, for a system having a channel bandwidth of 20 MHz, the transmission bandwidth of the system is 100 PRBs, and the 100 PRBs may be divided into 16 narrowbands when MTC is designed for a group of MTC systems. At a certain time point, the MTC UE can work only on one of the narrowbands. In existing LTE systems, the minimum allocation bandwidth for a PUSCH of MTC UE is one PRB, and the DCI format 6-0B has a resource block allocation field:

$$\left\lceil \log_2 \left\lfloor \frac{N_{RB}^{UL}}{6} \right\rfloor \right\rceil + 3Bit + 3 \text{ bits},$$

which is used for indicating the size and location of resources allocated to the PUSCH. $N_{RB}^{UL}$ is the size of uplink transmission bandwidth, $$\left\lceil \log_2 \left\lfloor \frac{N_{RB}^{UL}}{6} \right\rfloor \right\rceil$$

indicates on which narrowband the PUSCH works, and 3 bits are used for indicating which PRB or which two PRBs in the narrowband are used for transmitting the PUSCH. The definition of 3-bit information is shown in Table 3:

TABLE 3

| 3-bit Resource Allocation Field | Allocated Resource Block |
| --- | --- |
| '000' | First PRB in narrowband |
| '001' | Second PRB in narrowband |
| '010' | Third PRB in narrowband |
| '011' | Fourth PRB in narrowband |
| '100' | Fifth PRB in narrowband |
| '101' | Sixth PRB in narrowband |
| '110' | First and second PRBs in narrowband |
| '111' | Third and fourth PRBs in narrowband |

Existing LTE systems support only resource allocation at a smallest granularity of one PRB. In order to support sub-PRB resource allocation, at least the resource block allocation field in the DCI format 6-0B needs to be modified to support resource allocation at a granularity of subcarriers in one PRB. The following three manners may exist:

Manner 1

Figure 5:
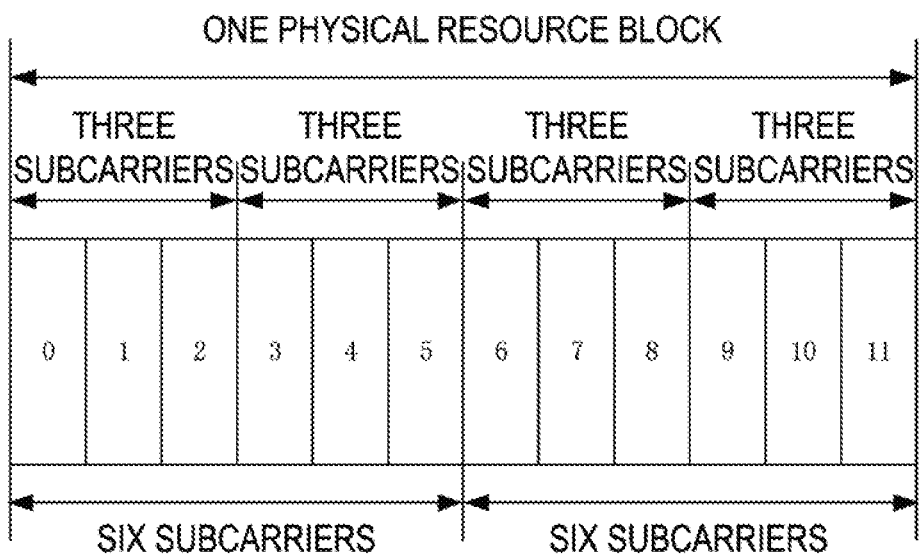
FIG. 5 illustrates subcarrier distribution of one PRB according to an embodiment of the present application.

The resource block allocation field is changed into a subcarrier allocation field, and the specific information is:

$$\left\lceil \log_2 \left\lfloor \frac{N_{RB}^{UL}}{6} \right\rfloor \right\rceil + 3Bit + 3Bit, \text{ wherein } \left\lceil \log_2 \left\lfloor \frac{N_{RB}^{UL}}{6} \right\rfloor \right\rceil + 3Bit$$

has the same definition as that in the existing LTE, and the further added 3 bits are used for indicating which subcarriers in 12 subcarriers of one PRB are used for transmitting the PUSCH. The allocated subcarriers are consecutive subcarriers in the frequency domain, and the number of subcarriers should be divisible by 12. In this way, allocatable subcarrier numbers are 1, 2, 3, 4, 6, and 12. 3 and 4 are close so that 4 can be removed. Two technologies for Internet of Things exist in existing LTE systems and are respectively MTC and NB-IoT. MTC and NB-IoT have different application scenarios: MTC is applied to mid to high-end markets, and NB-IoT is applied to low-end markets. Therefore, MTC does not need to support a PUSCH having a bandwidth of 1 subcarrier. The situation of 12 subcarriers may be indicated by the first 3-bit information. Therefore, only resource allocation of 3 and 6 subcarriers needs to be indicated. The distribution of subcarriers in one PRB is continuous. As shown in FIG. 5, 12 subcarriers in one PRB may be divided into four non-overlapping subcarrier groups of three consecutive subcarriers, and divided into two subcarrier groups of six consecutive subcarriers. In this way, there are only six combinations which can be indicated by 3 bits, as shown in Table 4. The second 3-bit information, namely, Table 4, applies only to the situation of one PRB in Table 3 and does not apply to the situation of two PRBs.

TABLE 4

| Second 3-bit Resource Allocation Field | Allocated Resource Block |
|---|---|
| '000' | First three consecutive subcarriers |
| '001' | Second three consecutive subcarriers |
| '010' | Third three consecutive subcarriers |
| '011' | Fourth three consecutive subcarriers |
| '100' | First six consecutive subcarriers |
| '101' | Second six consecutive subcarriers |
| '110' | Reserved |
| '111' | Reserved |

Optionally, the additional 3 bits may be used to indicate one of available subcarrier locations of one or more of allocatable subcarrier numbers of 1, 2, 3, 4, 6, and 12.

Manner 2

The resource block allocation field is changed into a subcarrier allocation field, and the specific information is:

$$\left\lceil \log_2 \left\lfloor \frac{N_{RB}^{UL}}{6} \right\rfloor \right\rceil + 6Bit, \text{ wherein } \left\lceil \log_2 \left\lfloor \frac{N_{RB}^{UL}}{6} \right\rfloor \right\rceil$$

has the same definition as that in the existing. Compared with Manner 1, this manner supports only resource allocation of three subcarriers and six subcarriers, and 6 bits are used to indicate possible locations of three subcarriers and six subcarriers in six PRBs of one narrowband. The distribution of three subcarriers and six subcarriers in each of the six PRBs is shown in FIG. 5. UE is configured, through high-layer signaling, to operate in the existing coverage enhancement mode B or sub-PRB enhancement of the coverage enhancement mode B. If the UE operates in the existing coverage enhancement mode B, the existing DCI format 6-0B is used. If the UE operates in sub-PRB enhancement of the coverage enhancement mode B, a newly-defined DCI format 6-0B or another DCI format used for sub-PRB enhancement is used. The definition of 6-bit information is shown in Table 5.

TABLE 5

| 6-bit Resource Allocation Field | Allocated Resource Block |
|---|---|
| '000000' | First three consecutive subcarriers of first PRB in narrowband |
| '000001' | Second three consecutive subcarriers of first PRB in narrowband |
| '000010' | Third three consecutive subcarriers of first PRB in narrowband |

TABLE 5-continued

| 6-bit Resource Allocation Field | Allocated Resource Block |
|---|---|
| '000011' | Fourth three consecutive subcarriers of first PRB in narrowband |
| . . . | . . . |
| '010110' | Third three consecutive subcarriers of sixth PRB in narrowband |
| '010111' | Fourth three consecutive subcarriers of sixth PRB in narrowband |
| '011000' | First six consecutive subcarriers of first PRB in narrowband |
| '011001' | Second six consecutive subcarriers of first PRB in narrowband |
| . . . | . . . |
| '100010' | First six consecutive subcarriers of sixth PRB in narrowband |
| '100011' | First six consecutive subcarriers of sixth PRB in narrowband |
| Other | Reserved |

Optionally, the 6 bits may be used to indicate one of available subcarrier locations of one or more of allocatable subcarrier numbers of 1, 2, 3, 4, 6, and 12.

Manner 3

The resource block allocation field is changed into a subcarrier allocation field, and the specific information is:

$$\left\lceil \log_2 \left\lfloor \frac{N_{RB}^{UL}}{6} \right\rfloor \right\rceil + 6Bit, \text{ wherein } \left\lceil \log_2 \left\lfloor \frac{N_{RB}^{UL}}{6} \right\rfloor \right\rceil$$

has the same definition as that in the existing LTE. In this manner, the 3-bit information (namely, the information in Table 1) of the resource allocation field in the DCI format 6-0B of the existing coverage enhancement mode B and possible location information of resource allocation of three subcarriers and six subcarriers supported in Manner 2 are arranged in a unified way to obtain a total of 42 possibilities, which may be indicated by 6-bit information, as shown in Table 6.

TABLE 6

| 6-bit Resource Allocation Field | Allocated Resource Block |
|---|---|
| '000000' | First PRB in narrowband |
| '000001' | Second PRB in narrowband |
| '000010' | Third PRB in narrowband |
| '000011' | Fourth PRB in narrowband |
| '000100' | Fifth PRB in narrowband |
| '000101' | Sixth PRB in narrowband |
| '000110' | First and second PRBs in narrowband |
| '000111' | Third and fourth PRBs in narrowband |
| '001000' | First three consecutive subcarriers of first PRB in narrowband |
| '001001' | Second three consecutive subcarriers of first PRB in narrowband |
| '001010' | Third three consecutive subcarriers of first PRB in narrowband |
| '001011' | Fourth three consecutive subcarriers of first PRB in narrowband |
| . . . | . . . |
| '011110' | Third three consecutive subcarriers of sixth PRB in narrowband |
| '011111' | Fourth three consecutive subcarriers of sixth PRB in narrowband |
| '100000' | First six consecutive subcarriers of first PRB in narrowband |
| '100001' | Second six consecutive subcarriers of first PRB in narrowband |

TABLE 6-continued

| 6-bit Resource Allocation Field | Allocated Resource Block |
|---|---|
| ... | ... |
| '101010' | First six consecutive subcarriers of sixth PRB in narrowband |
| '101011' | First six consecutive subcarriers of sixth PRB in narrowband |
| Other | Reserved |

Optionally, the 6 bits may be used to indicate one of available subcarrier locations of one or more of allocatable subcarrier numbers of 1, 2, 3, 4, 6, and 12.

Configuration Method for Sub-PRB Enhancement Function

The sub-PRB enhancement function is mainly applied to PUSCHs. The transmission of PUSCHs may be divided into a random access message 3 (Msg3) and subsequent PUSCHs before RRC connection establishment and PUSCHs after RRC connection establishment. Thus, the discussion may be carried out with respect to the following two cases:

Case 1

The sub-PRB enhancement function is applied to a random access message 3 (Msg3) and subsequent PUSCHs before RRC connection establishment and PUSCHs after RRC connection establishment. Namely, the sub-PRB enhancement function can be used by UE to transmit all PUSCHs.

To apply the sub-PRB enhancement function to the transmission of Msg3 and subsequent PUSCHs, an eNB may notify the UE through a media access control (MAC) random access response (RAR) whether to use the sub-PRB enhancement function to transmit Msg3 and subsequent PUSCHs. However, existing MTC UE does not support this function, and before receiving an RAR message, the UE needs to inform the eNB whether the MTC UE supports the sub-PRB enhancement function. This can only be implemented through a random access message 1 (Msg1). Namely, random access preamble sequences (Preamble) are divided into different groups, or different time-frequency resources are configured for random access preamble sequences (Preamble) to respectively transmit preamble sequences of existing MTC UE and MTC UE supporting the sub-PRB enhancement function. Then, the eNB may indicate, through an RAR, to the MTC UE supporting the sub-PRB enhancement function whether to use the sub-PRB enhancement function to transmit Msg3 and subsequent PUSCHs. After the UE enters an RRC connected state, the eNB may re-configure, through UE-specific RRC signaling, whether the UE uses the sub-PRB enhancement function to transmit PUSCHs.

In existing LTE systems, scheduling information of a PUSCH bearing Msg3 is located in RAR uplink grant information (UL grant). The content of RAR uplink grant information in the existing MTC is shown in Table 7.

TABLE 7

| DCI content | Coverage enhancement mode A | Coverage enhancement mode B |
|---|---|---|
| Msg3 PUSCH narrowband index | $N_{NB}^{index}$ | 2 |
| Msg3 PUSCH resource allocation | 4 | 3 |
| Msg3 PUSCH repetition number | 2 | 3 |
| MCS | 3 | 0 |
| TBS | 0 | 2 |
| TPC | 3 | 0 |

TABLE 7-continued

| DCI content | Coverage enhancement mode A | Coverage enhancement mode B |
|---|---|---|
| CSI request | 1 | 0 |
| UL delay | 1 | 0 |
| Msg3/4 MPDCCH narrowband index | 2 | 2 |
| Zero padding | $4 - N_{NB}^{index}$ | 0 |
| Total Nr bits | 20 | 12 |

For the coverage enhancement mode A, the uplink grant information has a total of 20 bits of information; for the coverage enhancement mode B, the uplink grant information has a total of 12 bits of information. To enable UE Msg3 and subsequent PUSCHs to support the sub-PRB enhancement function, bits need to be added to existing RAR uplink grant information to support resource allocation based on sub-PRBs. This embodiment uses the coverage enhancement mode B as an example for discussion. As mentioned above, to enable a user in the coverage enhancement mode B to support the sub-PRB enhancement function, 3 bits need to be added in the resource allocation field in the existing DCI format 6-0B; namely, 6-bit information is used to indicate the location of a PRB in the narrowband and locations of three consecutive subcarriers or six consecutive subcarriers in the PRB. The last column in Table 8 is RAR uplink grant information of a user in the coverage enhancement mode B that supports the sub-PRB enhancement function, which has a total of 15 bits of information.

TABLE 8

| DCI content | Coverage enhancement mode A | Coverage enhancement mode B | Coverage enhancement mode B having sub-PRB enhancement |
|---|---|---|---|
| Msg3 PUSCH narrowband index | $N_{NB}^{index}$ | 2 | 2 |
| Msg3 PUSCH resource allocation | 4 | 3 | 6 |
| Msg3 PUSCH repetition number | 2 | 3 | 3 |
| MCS | 3 | 0 | 0 |
| TBS | 0 | 2 | 2 |
| TPC | 3 | 0 | 0 |
| CSI request | 1 | 0 | 0 |
| UL delay | 1 | 0 | 0 |
| Msg3/4 MPDCCH narrowband index | 2 | 2 | 2 |
| Zero padding | $4 - N_{NB}^{index}$ | 0 | 0 |
| Total Nr bits | 20 | 12 | 15 |

Then, for UE in the coverage enhancement mode B that supports the sub-PRB enhancement function, how does the UE distinguish between two RAR uplink grant information formats? One way is to distinguish between the two formats by using different RA-RNTIs (random access-radio network temporary identifiers). Namely, the eNB puts together RAR messages of UE that uses the sub-PRB enhancement function to transmit Msg3 and subsequent PUSCHs, and uses different RA-RNTIs to transmit MPDCCHs which are responsible for scheduling PDSCHs bearing the RAR messages. The other way is to use a reserved bit in a MAC RAR message to indicate whether UE uses the sub-PRB enhancement function to transmit Msg3 and subsequent PUSCHs. In the MAC RAR message format in the existing MTC, the first bit is a reserved bit. When the bit is "0," it indicates that the MAC RAR is the coverage enhancement mode A and the coverage enhancement mode B; when the bit is "1," it indicates that the MAC RAR is the coverage enhancement mode B supporting the sub-PRB enhancement function.

Optionally, one or more bits of information is used in a MAC RAR to indicate whether the uplink grant information format in the MAC RAR is an uplink grant with the sub-PRB enhancement function.

Optionally, one or more bits of information is used in a MAC PDU (Protocol Data Unit) header or subheader corresponding to a MAC RAR to indicate whether the MAC RAR is a MAC RAR with the sub-PRB enhancement function or whether the uplink grant information format in the MAC RAR is an uplink grant with the sub-PRB enhancement function.

Case 2

The sub-PRB enhancement function is not applied to a random access message 3 (Msg3) and subsequent PUSCHs before RRC connection establishment, but applied only to PUSCHs after RRC connection establishment.

In this case, transmission of all PUSCHs before RRC connection establishment uses the existing transmission method, not supporting sub-PRB enhancement. But after the UE establishes an RRC connection, the eNB may configure, through UE-specific RRC signaling, whether the UE supporting the sub-PRB enhancement function uses the sub-PRB enhancement function to transmit PUSCHs.

The program running on the device according to the present invention may be a program that enables the computer to implement the functions of the embodiments of the present invention by controlling a central processing unit (CPU). The program or information processed by the program can be stored temporarily in a volatile memory (for example, a random access memory (RAM), a hard disk drive (HDD), a non-volatile memory (for example, a flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A user equipment (UE), comprising:
receiving circuitry configured to receive a Radio Resource Control (RRC) signaling; and
transmitting circuitry configured to transmit a Physical Uplink Shared channel (PUSCH), wherein:
a sub-Physical Resource Block (PRB) allocation for the PUSCH is enabled by the RRC signaling, and
after the sub-PRB resource allocation is enabled, whether resource allocation for the PUSCH includes at least one PRB or sub-PRB is indicated by a Downlink Control Information (DCI), and
when the DCI indicates resource allocation of at least one PRB, a first number of bits in the DCI is used to allocate a narrowband, and a second number of bits in the DCI is used to allocate at least one PRB in the narrowband for the PUSCH, and
when the DCI indicates sub-PRB resource allocation, the first number of bits in the DCI is used to allocate a narrowband, and a third number of bits in the DCI is used to allocate a number of subcarriers in the narrowband for the PUSCH, and
the third number of bits at least includes the second number of bits.

2. A base station apparatus, comprising:
transmitting circuitry configured to transmit a Radio Resource Control (RRC) signaling; and
receiving circuitry configured to receive a Physical Uplink Shared channel (PUSCH), wherein:
a sub-Physical Resource Block (PRB) allocation for the PUSCH is enabled by the RRC signaling, and
after the sub-PRB resource allocation is enabled, whether resource allocation for the PUSCH includes at least one PRB or sub-PRB is indicated by a Downlink Control Information (DCI), and
when the DCI indicates resource allocation of at least one PRB, a first number of bits in the DCI is used to allocate a narrowband, and a second number of bits in the DCI is used to allocate at least one PRB in the narrowband for the PUSCH, and
when the DCI indicates sub-PRB resource allocation, the first number of bits in the DCI is used to allocate a narrowband, and a third number of bits in the DCI is used to allocate a number of subcarriers in the narrowband for the PUSCH, and the third number of bits at, least includes the second number of bits.

3. A method used in a user equipment (UE), comprising:

receiving a Radio Resource Control (RRC) signaling; and transmitting a Physical Uplink Shared channel (PUSCH), wherein:

a sub-Physical Resource Block (PRB) allocation for the PUSCH is enabled by the RRC signaling, and after the sub-PRB resource allocation is enabled, whether resource allocation for the PUSCH includes at least one PRB or sub-PRB is indicated by a Downlink Control Information (DCI), and when the DCI indicates resource allocation of at least one PRB, a first number of bits in the DCI is used to allocate a narrowband, and a second number of bits in the DCI is used to allocate at least one PRB in the narrowband for the PUSCH, and when the DCI indicates sub-PRB resource allocation, the first number of bits in the DCI is used to allocate a narrowband, and a third number of bits in the DCI is used to allocate a number of subcarriers in the narrowband for the PUSCH, and the third number of bits at least includes the second number of bits.

4. A base station apparatus, comprising:

transmitting a Radio Resource Control (RRC) signaling; and receiving a Physical Uplink Shared channel (PUSCH), wherein:

a sub-Physical Resource Block (PRB) allocation for the PUSCH is enabled by the RRC signaling, and after the sub-PRB resource allocation is enabled, whether resource allocation for the PUSCH includes at least one PRB or sub-PRB is indicated by a Downlink Control Information (DCI), and when the DCI indicates resource allocation of at least one PRB, a first number of bits in the DCI is used to allocate a narrowband, and a second number of bits in the DCI is used to allocate at least one PRB in the narrowband for the PUSCH, and when the DCI indicates sub-PRB resource allocation, the first number of bits in the DCI is used to allocate a narrowband, and a third number of bits in the DCI is used to allocate a number of subcarriers in the narrowband for the PUSCH, and the third number of bits at least includes the second number of bits.

* * * * *